United States Patent [19]

Kokubu

[11] Patent Number: 4,844,138
[45] Date of Patent: Jul. 4, 1989

[54] AUTOMOBILE TIRE PNEUMATIC PRESSURE CONTROLLING APPARATUS

[75] Inventor: Sadao Kokubu, Gifu, Japan

[73] Assignee: Kabushiki Kaisha Tokai Rika Denki Seisakusho, Aichi, Japan

[21] Appl. No.: 90,933

[22] Filed: Aug. 31, 1987

[30] Foreign Application Priority Data

Sep. 1, 1986 [JP] Japan ............................. 61-205500
May 1, 1987 [JP] Japan ............................. 62-109528

[51] Int. Cl.$^4$ .................... B60C 23/16; B60C 23/10
[52] U.S. Cl. ................................. 152/417; 137/224; 141/38; 152/427; 180/905; 277/80; 285/11
[58] Field of Search .................. 152/415–417, 152/427, 429; 137/224; 277/13, 135; 141/38; 285/11; 73/146.4, 146.5; 340/58; 364/510, 558; 301/124 R, 125, 126; 180/905, 302, 6.58; 252/62.51

[56] References Cited

U.S. PATENT DOCUMENTS

4,605,233 8/1986 Sato ........................... 277/135 X
4,641,698 2/1987 Bitonti ........................... 152/416

FOREIGN PATENT DOCUMENTS

25597/85 2/1985 Japan .

Primary Examiner—Michael W. Ball
Assistant Examiner—Thomas Bokan
Attorney, Agent, or Firm—Finnegan, Henderson, Farabow, Garrett and Dunner

[57] ABSTRACT

An automobile tire pneumatic pressure controlling apparatus is disclosed. The automobile includes a vehicle body, vehicle compartment and axle shaft, and the control apparatus comprises a pressure source, a communication passage extending through the axle shaft and having one end opened to the automobile tire. The control apparatus further comprises a coupling means and valve means. The coupling means has a sealing means in sliding contact with the axle shaft and fluid-tightly maintains fluid communication between the pressure source and the other end of the communication passage. The valve means is disposed on a fluid path between the pressure source and the tire.

8 Claims, 3 Drawing Sheets

AUTOMOBILE TIRE PNEUMATIC PRESSURE CONTROLLING APPARATUS

BACKGROUND OF THE INVENTION

The present invention relates to a pneumatic pressure controlling apparatus for controlling the pneumatic pressure in an automobile tire, and more particularly, to such an apparatus capable of changing the pressure in the tire and controlling pneumatic pressure load detected at a vehicle body side.

In an automobile, the tire pnuematic pressure is controlled, if desired, in accordance with the road surface condition such as rain-wet surface snowfall and vehicle running condition such as high or low speed running. However, conventionally, the automobile must be stopped for changing the tire pressure. If high pressure is required, the automobile must be in the parked condition such as at a gasoline service station.

Further, if the tire pressure decreases to a level lower than the minimum pressure, fuel consumption may be increased. A special technique is required to detect the tire pressure at the vehicle compartment, since the tire is a rotational member. For example, in an attempt to detect the pneumatic pressure of the tire at the vehicle compartment by a pressure sensor mounted in the vehicle body side, a special sliding structure is required at a fluid passageway connecting the tire and the pressure sensor to fluid-tightly connect the totational member to the stationary member. This sliding structure must provide wear resistance as well as fluid-tightness. Therefore, in the apparatus proposed, disposed at the tire side (movable side) are the pressure sensor and a wireless transmitter which sends wireless or radio signal of detection, and disposed at the vehicle side is a receiver which receives the output signal from the transmitter.

However, according to the apparatus proposed, the resultant apparatus has a complicated structure and requires an expensive transmitter and detector. Therefore, the entire device becomes costly.

SUMMARY OF THE INVENTION

It is therefore an object of the present invention to overcome the above-mentioned drawbacks and to provide an improved tire pneumatic pressure controlling apparatus.

Another object the invention is to provide such an apparatus capable of performing easy pressure control regardless of the running condition and running or stationary position of the vehicle.

Still another object of the present invention is to provide such an improved apparatus in which pressure detection is attainable in the vehicle compartment.

Still another object of the invention is to provide the apparatus having a simplified construction which can be produced at low cost.

Still another object of the invention is to provide an apparatus which provides, high durability, high pressure detecting function, and can be easily assembled.

Still another object of the invention is to provide the control apparatus in which pneumatic pressure of the tire is positively controlled.

Briefly, and in accordance with the present invention, a pressure source is installed on the vehicle body side, and a communication passage is formed in an axle shaft. The passage has one end in fluid communication with a tire, and the other end is in communication with the pressure source. Between the other ene of the passage and the pressure source, a coupling means is provided. The coupling means includes a sealing means in sliding contact with the axle shaft and provides an air-tight relationship between the pressure source and the other end of the passage. Further, in the fluid path between the pressure source and the tire, a valve means is provided. when the valve means is opened, the pressure source is connected to the tire through the fluid passage and the coupling means. Therefore, by changing the pressure level at the pressure source, the pneumatic pressure desired in the tire is obtainable regardless of the vehicle running condition or vehicle position.

According to one embodiment of the present invention, an annular space is provided by providing a plurality of annular projections radially projecting from the inner periphral surface of an outer race and/or from the outer peripheral surface of an inner race of a bearing means. The embodiment also includes a communication passage, vent holes, permanent magnet members, magnetic fluid, and control means. The communication passage has one end in communcation with the tire, and the other end portion extending through the inner race and in communication with the annular space. The vent holes extend through the outer race and are in communication with the annular space. The permanent magnet members are postioned in the annular space. The magnetic fluid fluid-tightly maintains the annular space by the magnetic flux generated by the permanent magnet members. The control means controls the pneumatic pressure detected through the communication passage, the annular space and the vent holes. A valve means is provided to selectively connect the pressure source fo the vent holes. The control means also controls the opening degree of the valve means in response to a detection of the pneumatic pressure detected through the communication passage, the annular space and the vent holes.

The vent holes communicate with the tire through the communication passage and the annular space is fluid-tightly maintained. In this case, the outer race formed with the vent holes is supported, in a stationary position so that the pressure in the tire which is the movable member is directly detected through the vent holes which are stationary, so that detection performance is enhanced. In this case, since the magnetic fluid activated by the permanent magnet members is used at the fluid tight portion between the rotating inner race and the stationary outer race, no frictional wear occurs at the fluid-tight portion despite the rotational movement of the inner race. Therefore, enhanced durability is obtainable. Further, a compact apparatus results since the annular space required for the pressure detection is proviced inside the bearing portion which rotatably supports the axle shaft. Furthermore, assembleability is improved, since the pressure control apparatus can be made in a unit together with the bearing means. Moreover, when the valve means is opened, the pressure source communicates with the tire. With this arrangement, the tire pressure is positively controlled by controlling the opening degree of the valve means by a control means

DETAILED DESCRIPTION OF THE PREFERRED EMBODIMENTS

Figure 1:
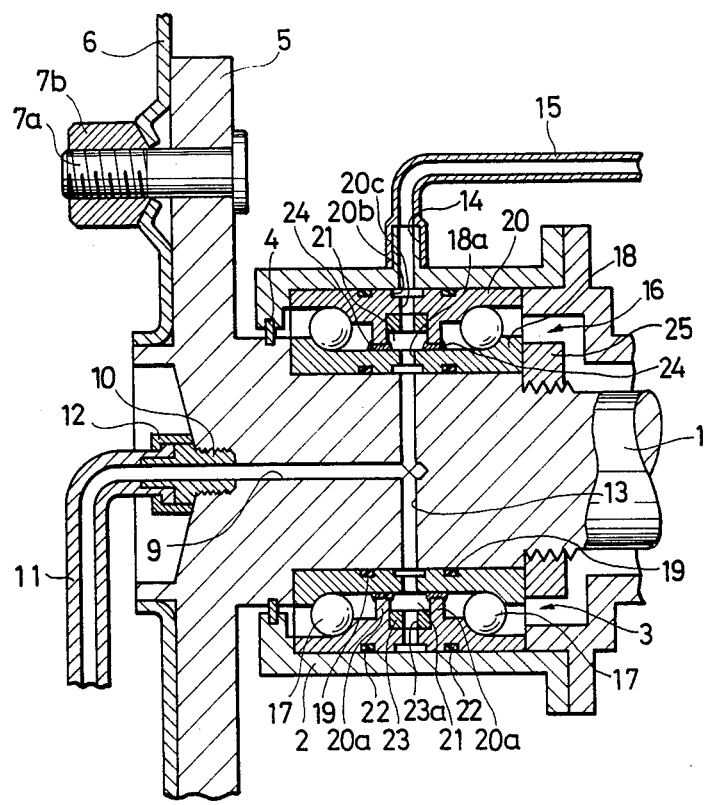
FIG. 1 is a cross-sectional view showing an essential portion according to a first embodiment of the present invention.

A first embodiment according to the present invention will be described with reference to FIGS. 1–3. In the first embodiment, the present invention is adapted to an automobile, and FIG. 1 shows a pneumatic pressure controlling apparatus assembled to one of the wheels of the automobile. In FIG. 1, an axle shaft 1 (movable member) extends through an axle housing member 2 (stationary member), and is supported thereby through a bearing means 3. A sealing means 4 is provided at an axial end portion of the housing member 2. A hub member 5 is provided integral with an end portion of the axle shaft 1, and a load wheel 6 is fixedly secured to the hub 5 by means of a hub bolt 7a and a nut 7b. A tire 8(shown in FIG. 6) is mounted on the load wheel 6.

A first communication passageway 9 is formed in the axle shaft 1. The communication passageway 9 extends in an axial center of the axle shaft 1, and has an open end opened at an end face of the axle shaft 1. The open end portion of the passageway 9 is in fluid communication with the tire interior through a mouthpiece 10 and a pipe 11. The mouthpiece 10 is connected to the open end of the passageway 11 and the pipe 11 is coupled to the mouthpiece 10. A nut 12 is coupled to the pipe end in order to sealingly couple the pipe 11 to the mouthpiece 10.

A second communication passageway 13 is formed in the axle shaft 1. The second passageway 13 extends in radial direction of the axle shaft 1, and the other end of the first passageway 9 is in fluid communication with the second passageway 13. A coupling member 14 extends through the wall of the housing member 2, and is connected to a pipe 15. The coupling member 14 is in alignment with the second passageway 13 in the radial direction of the shaft 1.

A coupling means 16 is provided between the pipe 15 and the second communication passageway 13, i.e., between the pipe 15 and the first communication passageway 9 so as to provide fluid-tight connection therebetween. Details of the coupling means 16 will be described with reference to FIGS. 2 and 3. The coupling means 16 includes the above-mentioned bearing means 3. The bearing means 3 is in the form of double bearings 17,17 which are arranged in the axial direction of the axle shaft 1 as shown in FIG. 1. An inner race of the bearing means 3 is subdivided into two pieces 18 and 18 in an axial direction thereof as best shown in FIG. 3, and the two pieces confront with each other. The inner race is formed of a magnetic material. At each of the confronting portions of the inner race pieces 18,18, four recesses are formed at every 90 degrees angular positions. When the two inner race pieces confront each other, these recesses provide four perforation holes 18a extending in the radial direction of the shaft 1. Two of the four perforation holes 18a are in alignment with the radially open ends of the second communication passageway 13 upon assembly of the inner races to the outer peripheral surface of the axle shaft 1. O-rings 19,19 are provided at both sides of the perforation holes 18a between the axle shaft 1 and the inner races 18, so that fluid passing through the holes 18a can be sealed by the O-rings.

On the other hand, an outer race 20 of the bearing means 3 is not subdivided but is a singular member. The outer race is formed of a magnetic material. Two annular projections 20a,20a protrude radially inwardly from an inner peripheral surface of the outer race 20. A space 21 is provided between the projections 20a and 20a, which space is in confrontation with the perforation holes 18a of the inner races 18. In this case, a gap defined between the outer peripheral surface of the inner races and radially inner end faces of the annular projections 20a is minimized.

An outer peripheral surface of the outer race 20 of the bearing means 3 is formed with an annular groove 20b. At the bottom portion of the groove 20b, four vent holes 20c are formed. These vent holes 20c extend in the radial direction of the bearing means, and are provided at every 90 degrees angular positions. The vent holes extend through the wall of the outer race 20. When the outer race 20 is assembled with the inner peripheral surface of the housing member 2, and annular groove 20b is in alignment with the coupling member 14. O-rings 22 are provided at both sides of the annular groove 20b, and between the axle housing member 2 and the outer race 20.

A cylindrical permanent magnet member 23 is disposed between the annular projections 20a and 20a of the outer race 20. The magnet member 23 is magnetized along an axial direction thereof, and consists of four arcuate permanent magnets of depressed shape, and each having the same configuration. The four magnets are assembled to provide a hollow cylindrical magnet member 23, and the holes 23a are provided at the contacting faces of the four magnet pieces. As a result, the holes 23a are provided at every 90 degrees angular position. When the permanent magnet member 23 is assembled in the inner peripheral surface of the outer race 20 and between the annular projections 20a and 20a, each of the holes 23a is in alignment with each of the vent holes 20c of the outer race 20.

Figure 2:
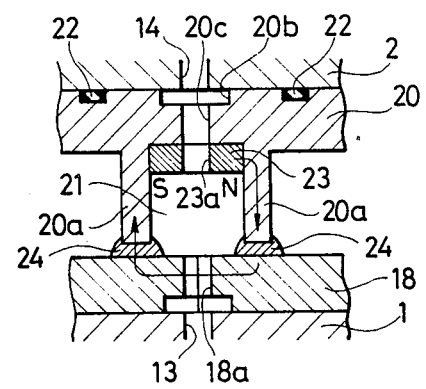
FIG. 2 is an enlarged cross-sectional elevation showing a coupling means according to the first embodiment.

By the provision of the permanent magnet member 23, magnetic flux generated by the permanent magnet member 23 passes through the inner and outer races formed of the magnetic material as shown by an arrow in FIG. 2. This circulation of the magnetic flux greatly increases magnetic flux density at the gap defined between the outer peripheral surface of the inner races 20 and the radially inner end faces of the annular projections 20a.

With this increase of the magnetic flux density at that portion, magnetic fluid 24 in the annular space 21 is concentrated at the gap portion defined between the outer peripheral surface of the inner race and the radially inner end faces of the annular projections. Therefore, the magnetic fluid 24 serves to maintain a fluid tight arrangement with respect to the annular space 21 because of the magnetic flux of the magnet member 23. This fluid-tight arrangement is maintained even at the rotation phase of the inner race 18. Thus, pneumatic pressure in the automobile tire 8 is detectable even during the rotational phase of the axle shaft through the pipe 11, first communication passageway 9, second communication passageway 13, perforation holes 18a of the inner races 18, annular space 21, holes 23a of the permanent magnet member 23, vent holes 20c of the outer race 20, annular groove 20b of the outer race 20, a coupling member 14, and the pipe 15.

Figure 3:
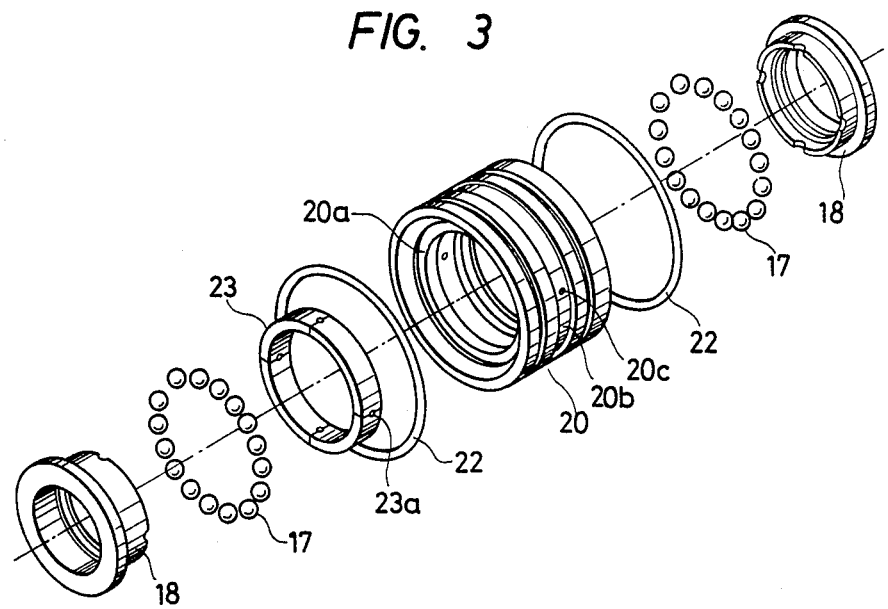
FIG. 3 is an exploded segmental view showing the coupling means of the first embodiment.

The mechanical segments shown in FIG. 3 are provisionally assembled together to provide a unit, and the unit is mounted on the axle shaft 1. After the unit is mounted to the shaft 1, a planar end of the inner race 18 is held by a nut 25 threadingly engaged with the axle shaft 1, so that the inner race is fixed to the shaft 1. The outer race 20 is fixed to the axle housing member 2 by a suitable member (not shown).

Figure 4:
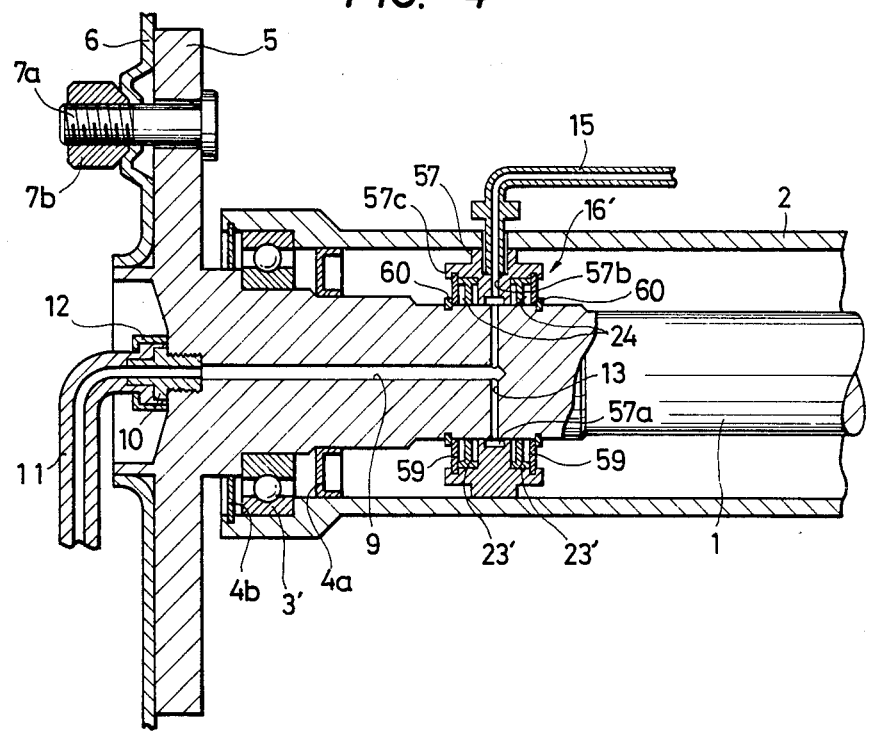
FIG. 4 is a cross-sectional view showing an essential portion according to a second embodiment of the invention.
Figure 5:
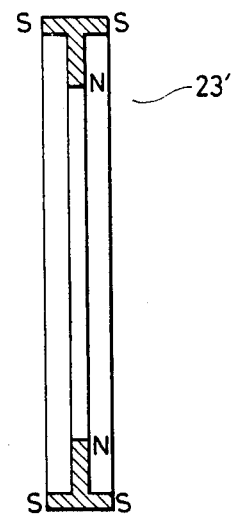
FIG. 5 is an enlarged cross-sectional view showing a permanent magnet member used in the second embodiment; and, FIG. 6 is a schematic diagram showing a pneumatic pressure supplying system which supplies pneumatic pressure to an automobile tire according to the present invention.

A second embodiment of the present invention will be described with reference to FIGS. 4 and 5, wherein like parts and components are designated by the same reference numerals and characters as those shown in FIGS. 1–3. In the second embodiment, oil seals 4a and 4b are provided at both sides of a single bearing 3', and there is no member corresponding to the coupling member 14 in the first embodiment.

The structure of a coupling means 16' is different from theat of the coupling means 16 in the first embodiment. That is, according to the coupling means 16' of the second embodiment, an annular coupling case 57 is fixed to the axle housing member 2 (stationary member). The coupling case 57 surrounds the outer surface of the axle shaft 1 in such a manner that the case 57 is in soft abutment therewith. The coupling case 57 has an inner peripheral surface formed with an annular space 57a which position is in alignment with the rotational locus of the open ends of the second communication passageway 13. In the coupling case 57, a radial vent passage 57b is formed which allows the annular space 57a to fluid-tightly communicate with the pipe 15.

Annular permanent magnet members 23' are disposed at both sides of the vent passage 57b. The magnet members 23' also serve as annular sealing members, and are disposed between the inner peripheral surface of the annular coupling case 57 and the outer peripheral surface of the axle shaft 1. As shown in FIG. 5, the permanent magnet member 23' has T-shape cross-section. The three projections of the T-shape are magnetized so that each has a magnetic pole different from each other. For example, in FIG. 5, leftward projection has S-pole, downward projection has N-pole, and rightward projection has S-pole. A pair of annular sealing plates 59, 59 are disposed at both axial end portions of the coupling case 57. Each of the annular sealing plates 59 is disposed at an axially outer portion of the permanent magnet member 23' and is positioned between the axle shaft 1 and sleeve portion 57c of the case 57. The outer peripheral end portion of the annular sealing plate 59 is fitted with an annular groove of the sleeve portion 57c. Further, stop rings 60 are fitted on the outer peripheral surface of the axle shaft 1 to fix an inner peripheral end portion of the sealing plate 59 at a position.

A magnetic fluid 24 which serves as sealing means is filled in a space defined by the coupling case 57, permanent magnet members 23' and the sealing plates 59. Accordingly, the magnetic fluid 24 in the space is in sliding contact with the axle shaft 1 with being adsorbed by the permanent magnet member 23', so that a fluid-tight arrangement is obtained between a spaced portion 57a of the coupling case 57 which is a stationary side and end openings of the second passageway 13 which is the moving side because of the action of the magnetic fluid 24.

Figure 6:
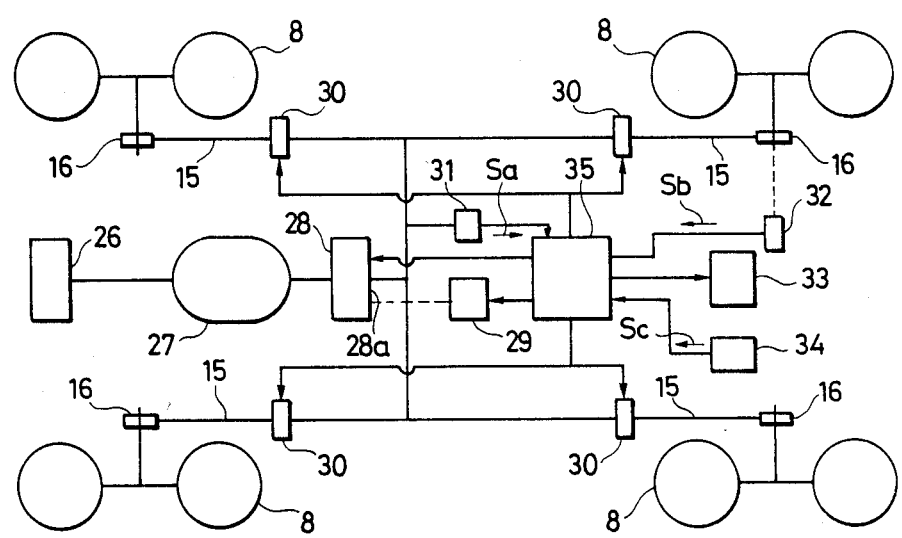

FIG. 6 is a schematic diagram showing control of pneumatic pressure in the four tires 8 by the application of the pneumatic pressure control apparatus of the present invention which employs the above-mentioned coupling means 16 and 16' described in the first and second embodiments respectively.

In FIG. 6, an air compressor 26 is connected with an air tank 27 which accumulates compressed air therein supplied from the compressor 26. The air tank 27 is connected with a regulator 28 which supplies air having predetermined compressed pressure to tires 8. The air pressure is controllable within a predetermined range by an actuator 29, and air supply from the regulator can be started or stopped by the actuator 29. Further, an air discharge outlet 28a of the regulator 28 is connected to pipes 15 for the respective tires. Therefore, when the air discharge outlet 28a is opened, an air communication passageway is provided between the air tank 27 and the tire interiors through the regulator 28, pipe 15, the coupling means 16, second and first passageway 13 and 9, and pipe 11. The air compressor 26, the air tank 27 and the regulator 28 are mounted preferably on a vehicle body.

Electromagnetic valves 30 are respectively provided on the air communication passageway, such as on the pipes 15. Further, pressure sensor 31 is provided to detect the pressure in the passageway, particularly in the pipe 15, in its turn the tire pressure. The sensor 31 generates pressure signal Sa as shown. A vehicle velocity sensor 32 is provided which detects predetermined rotation numbers of the axle shaft 2. The sensor 32 generates vehicle velocity signal Sb as shown. Further, an indicator 33 is provided in a vehicle compartment. The indicator 33 displays the actual pressure of tires 8 as well as predetermined pneumatic pressure preset by an operation switch (described later) and instructs when the tire pressure is reduced to a level less than the predetermined level. A control means 35 is also provided in the vehicle compartment. The control means 35 control the operations of the actuator 29, which in turn controls the pressure level or pressure supply at the air discharge outlet 28a of the regulator 28, electromagnetic valve 30 and indicator 33 in accordance with the operation signal Sc sent from the operation switch 34, pressure signal Sa and the vehicle velocity signal Sb. Incidentally, the operation signal Sc sent from the operation switch 34 includes a first command signal for determining the pneumatic pressure of the tire 8 and a second command signal for selectively suspending the operation of the control means 35.

With this arrangement, when the operation of the control means 35 is suspended, each of the electromagnetic valves 30 are maintained in their closed position. On the other hand, when the operation of the control means 35 is initiated, the control means 35 normally render the air discharge outlet 28a of the regulator 28 to be closed by way of the actuator 29. During the outlet closing state, each of the electromagnetic valves 30 is successively opened one by one, and pressure signal Sa at the time of valve opening is read out. Thus, pneumatic pressure in each of the tires is monitored in accordance with the read out pressure signal Sa. The control means 35 sends an instruction to the indicator 33, so that the monitored pneumatic pressures relative to the tires are displayed in the indicator 33. Further, the control means 35 sends an instruction to the indicator 33 for instructing the pressure decrease in the tire 8 if the monitored pneumatic pressures become lower than the predetermined minimum level. In this case, it is preferable to concurrently indicate the specific tire 8 which is subjected to pressure decrease.

In addition to the above-mentioned alarming function, the control means 35 maintains a valve open state of a specific electromagnetic valve 30 corresponding to the specific tire subjected to pressure decrease. Further, the control means 35 sends an instruction to open the air discharge outlet 28a of the regulator 28 by way of the actuator 29. During this period, pneumatic pressure of the specific tire is monitored in accordance with the pressure signal Sa. In this case, the control means 35 controls the pneumatic pressure supplied from the regulator 28 to a predetermined pressure level which is instructed from the operation signal Sc from the operation switch 34. Therefore, air is supplied from the regulator 28 to the specific tire having reduced pressure until the tire has a predetermined pressure.

When the pneumatic pressure of the tire 8 reaches the predetermined pressure level, the control means 35 closes the air discharge outlet 28 of the regulator 28, and the above-mentioned pressure monitoring operation is again started.

Further, the control means 35 always reads out the vehicle velocity signal Sb for monitoring the velocity of the vehicle. If the monitored vehicle velocity exceeds the predetermined level such as for example 80 to 90 km/h, the control means sends an instruction signal to open each of the electromagnetic valves 30 and to open the air discharge outlet 28a by way of the actuator 29. Therefore, the pressure level supplied from the regulator 28 is controlled to have a predetermined pressure. As a result, pneumatic pressures in the respective tires 8 are automatically increased during high speed travel of the vehicle. If the vehicle velocity is lowered to an ordinary velocity, the above-mentioned high pressure condition is cancelled, and the electromagnetic valve 30 is opened and the pressure level supplied from the regulator 28 is lowered.

According to the above-described embodiments when the pneumatic pressure of the tire 8 is less than the predetermined minimum level, such pressure decrease is displayed in the indicator. Even during vehicle running, the pneumatic pressure is automatically increased to a predetermined level regardless of the vehicle position. As a result, optimum pneumatic pressure is obtainable for the enhancement of the vehicle running performance, to thereby decrease fuel consumption. Further, according to a first embodiment of the present invention, fluid tightness between the hole 18a of the inner race 18(rotary side) and the space 21 of the outer race 20(stationary side) is obtained by the magnetic fluid 24 activated by the permanent magnet member 23. With this structure, no frictional wear occurs which wear is seen in the conventional solid sealing member. Thus, any leakage from space 21 is prevented.

Further, the pneumatic pressure in the tire 8 is directly detected at the vehicle body side, and therefore detection efficiency is improved with simplified construction which does not require a transmitter and a receiver such as those used in the apparatus proposed. Furthermore, in the first embodiment, the space 21 which is required for the pressure detection is provided inside the bearing means 3 by utilizing the outer race 20, so that a compact apparatus results with a simple structure. Moreover, the coupling means 16 is assembled as one unit to the axle shaft, so that assembleability is enhanced.

In the first embodiment, two annular projections 20a are provided at the inner peripheral surface of the outer race 20 in order to provide the annular space 21. However, this space is also provided by providing two annular projections at the outer peripheral surface of the inner race 18, or by providing a single annular projection at the outer surface of the inner race, and another annular projection at the inner surface of the outer race 20.

Further, in the above embodiments, air is automatically supplied to the tire when the pneumatic pressure therein is reduced. However, it is also possible to manually control the pressure by manually opening the electromagnetic valve 30 in accordance with the operator's will. By this manual operation, pneumatic pressure can be changed in response to the road surface conditions such as rain-wet surface, or snowfall. Furthermore, it is possible to independently control pneumatic pressure of the respective tires.

According to the second embodiment of the present invention, fluid-tightness is obtained between the second passageway 13 in the shaft 1(rotary side) and the space 57a in the coupling case 57(stationary side) by the magnetic fluid 24 activated by the magnets 23'. Therefore, similar to the first embodiment, there is no frictional wearing, which wear occurs in the conventional solid sealing member, since the magnetic fluid serves as the sealing element. As a, a sufficient seal results between the axle shaft 1 and the coupling case 57 for an prolonged period and the durability of entire apparatus is improved.

In view of the foregoing, according to the present invention, the pneumatic pressure of the tire is controllable to a predetermined level regardless of the vehicle running condition or vehicle position. Further, a simplified overall apparatus results having a compact size with low production costs and easy assembleability to the vehicle. Yet the apparatus provides high durability and high pressure detecting performance, and is capable of directly detecting the pressure level at the vehicle body side. Furthermore, the tire pressure is positively controlled, if desired.

While the invention has been described in detail and with reference to specific embodiments thereof, it will be apparent to one skilled in the art that various changes and modifications can be made therein without departing from the spirit and scope of the invention.

What is claimed is:

1. An apparatus for controlling pneumatic pressure of a tire of an automobile, the automobile including an axle shaft, the apparatus comprising:

a pressure source;

a communication passage extending through the axle shaft, said communication passage including first and second passageways, said first passageway being in communication with the automobile tire;

a coupling means surrounding the axle shaft, said coupling means having a sealing means in sliding contact with said axle shaft, said coupling means fluid-tightly maintaining fluid communication between the pressure source and the second passageway, said second passageway extending substantially radially within the axle shaft and passing through the axle shaft to the coupling means; and a valve means disposed on a fluid path betweem said pressure source and the tire.

2. The apparatus as defined in claim 1, wherein said pressure source is installed on a vehicle body.

3. The apparatus as defined in claim 2, further comprising a control means for controlling operation of said valve means from a vehicle compartment.

4. The apparatus as defined in claim 1, wherein said coupling means comprises a magnet member surrounding said axle shaft, and a magnetic fluid absorbed by said magnet member and being in sliding contact with said axle shaft, said magnet member and said magnetic fluid serving as said sealing means.

5. The apparatus as defined in claim 1, wherein said coupling means comprises:
- a bearing means for rotatably supporting said axle shaft, said bearing means having an inner race and an outer race, each of said inner and outer races having an inner and outer peripheral surface;
- a plurality of annular projections radially protruding from at least one of the inner peripheral surface of said outer race and the outer peripheral surface of said inner race, said plurality of annular projections defining a space portion therebetween, said second passageway extending through said inner race to said space portion, and said outer race being formed with a vent hole communicating with said space portion;
- a permanent magnet member disposed in said space portion; and
- a magnetic fluid in said space portion for maintaining a fluid-tight seal of said space portion in response to magnetic flux of said magnet member which concentrates said magnetic fluid at said projections and the other of said inner or outer race.

6. The apparatus as defined in claim 5, further comprising a control means for detecting and controlling a pneumatic pressure of said tire through said communication passage, said space portion and said vent hole.

7. The apparatus as defined in claim 2, wherein said coupling means comprises:
- a bearing means for rotatably supporting said axle shaft, said bearing means having an inner race and an outer race, each of said inner and outer races having an inner and outer peripheral surface;
- a plurality of annular projections radially protruding from at least one of the inner peripheral surface of said outer race and the outer peripheral surface of said inner race, said plurality of annular projections defining a space portion therebetween, said second passageway extending through said inner race, and said outer race being formed with a vent hole communicating with said space portion;
- a permanent magnet member disposed in said space portion; and
- a magnetic fluid in said space portion for maintaining a fluid-tight seal of said space portion in response to magnetic flux of said magnet member.

8. The apparatus as defined in claim 7, further comprising a valve means for selectively providing fluid communication between said pressure source and said vent hole; and a control means for opening and closing said valve means upon detection of a pneumatic pressure of said tire through said communication passage, said space portion and said vent hole.

* * * * *